United States Patent
Repasi

(10) Patent No.: US 8,990,353 B2
(45) Date of Patent: Mar. 24, 2015

(54) RECOMMENDED ALTERATION TO A PROCESSING SYSTEM

(75) Inventor: Rolf Repasi, Noosa Heads (AU)

(73) Assignee: Codeius Pty Ltd., Sydney, NSW (AU)

( * ) Notice: Subject to any disclaimer, the term of this patent is extended or adjusted under 35 U.S.C. 154(b) by 227 days.

(21) Appl. No.: 13/421,129

(22) Filed: Mar. 15, 2012

(65) Prior Publication Data

US 2012/0239786 A1 Sep. 20, 2012

Related U.S. Application Data

(60) Provisional application No. 61/454,040, filed on Mar. 18, 2011.

(51) Int. Cl.
| | | |
|---|---|---|
| G06F 15/16 | (2006.01) | |
| H04L 12/64 | (2006.01) | |
| H04L 12/00 | (2006.01) | |
| H04L 12/931 | (2013.01) | |

(52) U.S. Cl.
CPC ............. *H04L 12/6418* (2013.01); *H04L 12/00* (2013.01); *H04L 49/35* (2013.01)
USPC ....................................................... 709/219

(58) Field of Classification Search
CPC ..................... H04L 29/08261; H04L 29/0827; H04L 29/08279; H04L 67/1029; H04L 67/1031; H04L 67/1034; H04L 67/1038; H04L 12/6418; H04L 12/00; H04L 49/35
USPC ........................................................ 709/219
See application file for complete search history.

(56) References Cited

U.S. PATENT DOCUMENTS

| | | | | |
|---|---|---|---|---|
| 6,298,451 | B1 * | 10/2001 | Lin | 714/4.2 |
| 7,870,550 | B1 | 1/2011 | Qureshi et al. | |
| 8,255,369 | B2 * | 8/2012 | Luo et al. | 707/674 |
| 2006/0080569 | A1 * | 4/2006 | Sciacca | 714/4 |
| 2009/0327519 | A1 * | 12/2009 | Thiel et al. | 709/239 |
| 2013/0031403 | A1 * | 1/2013 | Mordani et al. | 714/4.11 |

* cited by examiner

*Primary Examiner* — Krisna Lim
(74) *Attorney, Agent, or Firm* — Bracewell & Giuliani LLP

(57) ABSTRACT

The present invention relates to a method, processing system and a computer readable medium for determining a recommended alteration to a client processing system. In one aspect, the processing system comprises:
- a server processing system;
- a community application data store, in communication with the server processing system, having stored therein application data indicative of one or more applications used by a plurality of processing systems;
- a computer readable medium in communication with the server processing system, wherein the computer readable medium, when used by the server processing system, causes the server processing system to:
  - determine, based on the community application data store, a recommended alteration to a client processing system, the client processing system being one of the plurality of processing systems; and
  - transfer the recommended alteration to the client processing system.

20 Claims, 4 Drawing Sheets

RECOMMENDED ALTERATION TO A PROCESSING SYSTEM

CLAIM FOR PRIORITY

This application claims priority under 35 U.S.C. §119(e) to Provisional Application No. 61/454,040, filed 18 Feb. 2011, the entire disclosure of which is incorporated by reference herein.

TECHNICAL FIELD

The present invention relates to a method, processing system, and a computer readable medium for determining a recommended alteration to a client processing system.

BACKGROUND

There are currently a significant number of software applications that are available for use on a processing system which attempt to provide similar functionality. Each application has perceived advantages and disadvantages which is generally taken into account when selecting to install a particular application on a processing system. However, sources of information which are currently available in making this selection can be misleading or inappropriate.

One source of information can be expert reviews of particular applications. However, some reviews can be biased or misleading. Additionally, the specific configuration of the reviewer's processing system may have influenced the review of the application.

Therefore, there is a need to overcome or alleviate one or more of the above-mentioned problems or provide a useful alternative.

SUMMARY

In one aspect there is provided a system to determine a recommended alteration to a client processing system, wherein the system comprises:
- a server processing system;
- a community application data store, in communication with the server processing system, having stored therein application data indicative of one or more applications used by a plurality of processing systems;
- a computer readable medium in communication with the server processing system, wherein the computer readable medium, when used by the server processing system, causes the server processing system to:
  - determine, based on the community application data store, a recommended alteration to a client processing system, the client processing system being one of the plurality of processing systems; and
  - transfer the recommended alteration to the client processing system.

In certain embodiments, the server processing system is configured to receive a recommendation request from the client processing system to determine the recommended alteration.

In certain embodiments, the recommended alteration includes one or more new applications recommended for use by the client processing system.

In certain embodiments, the server processing system is configured to:
- determine at least one of:
  - a user profile for a user of the client processing system; and
  - a client processing system configuration indicative of the configuration of the client processing system;
- determine, based on at least one of the use profile and the client processing system configuration, the recommended alteration.

In certain embodiments, the server processing system is configured to:
- determine one or more application categories for the one or more applications used by the client processing system; and
- determine, based on the one or more application categories, the user profile.

In certain embodiments, at least some of the application data associated with the client processing system is indicative of at least one of:
- an amount of time the one or more applications have been used; and
- a client processing system configuration;
- wherein the server processing system is configured to determine, based on at least one of the amount of time the one or more applications have been used and the client processing system configuration, the user profile.

In certain embodiments, the server processing system is configured to:
- determine, based upon the application data of the client processing system, if one or more recommendation thresholds have been satisfied; and
- in response to at least one of the one or more of the recommendation thresholds being satisfied, determine the recommendation alteration to the respective client processing system.

In certain embodiments, at least some of the application data associated with the client processing system is indicative of an amount of time the one or more applications have been used, wherein the server processing system is configured to determine if at least one of the one or more recommendation thresholds have been satisfied based upon the amount of time the one or more applications have been used.

In certain embodiments, at least some of the application data associated with the client processing system is indicative of an amount of instances the one or more applications have crashed, wherein the server processing system is configured to determine if at least one of the one or more recommendation thresholds have been satisfied based upon the amount of instances the one or more applications have crashed.

In certain embodiments, at least some of the application data associated with the client processing system is indicative of at least one of a frequency and duration of use of at least some of the one or more applications, wherein the server processing system is configured to determine if at least one of the one or more recommendation thresholds have been satisfied based upon at least one of the frequency and duration of use.

In certain embodiments, the server processing system is configured to:
- categorize each application according to an application category in the community application data store;
- determine the application category for a particular application of the client processing system; and
- determine, based on the community application data store, the recommended alteration indicative of one or more new applications which correspond to the application category for the particular application.

In certain embodiments, the server processing system is configured to:

determine, from the community application data store, a plurality of new applications having a corresponding application category to the particular application;

determine, based on the community application data, recommendation scores for the plurality of new applications; and generate a ranked list of new applications, ordered according to the recommendation scores, for the recommended alteration.

In certain embodiments, the server processing system is configured to:

determine, from the community application data store, a plurality of new applications having a corresponding application category to the particular application;

determine, based on the community application data, recommendation scores for the plurality of new applications; and determine, based on a selection criteria and the recommendation scores, at least one of the new applications from the plurality of new applications for the recommended alteration.

In certain embodiments, in the event that the recommended alteration is provided to one of the client processing systems based on the particular application crashing, the server processing system is configured to weight the recommendation scores based on a number of instances each new application has been reported as having crashed in the community application data store.

In certain embodiments, the recommended alteration is indicative of one or more new applications as an alternative for at least one of the one or more applications used by the client processing system.

In another broad aspect there is provided a non-transitory computer readable medium for configuring a client processing system to obtain a recommended alteration from a server processing system, the non-transitory computer readable medium including executable instructions which, when executed, configure the client processing system to:

generate application data indicative of one or more applications used by the client processing system;

transfer, to the server processing system, the application data to the server processing system for storage as part of a community application data store; and receive, from the server processing system, a recommended alteration to the client processing system based upon the community application data store.

In certain embodiments, the recommended alteration is indicative of one or more new applications as an alternative for at least one of the one or more applications used by the client processing system.

In certain embodiments, the executable instructions configure the client processing system to transfer a recommendation request to the server processing system in order to receive the recommended alteration to the client processing system.

In certain embodiments, the recommendation request is transferred to the server processing system in response at least one of:

the client processing system detecting a monitored event performed by the client processing system;

a schedule; and user operation of an input device of the client processing system.

In certain embodiments, the application data generated by the client processing system is indicative of at least one of:

an amount of time the one or more applications have been used;

an amount of instances the one or more applications have crashed; and an amount of instances a user switches focus between at least some of the one or more applications.

Other embodiments will be appreciated from the detailed description of preferred embodiments.

BRIEF DESCRIPTION OF DRAWINGS

Example embodiments should become apparent from the following description, which is given by way of example only, of at least one preferred but non-limiting embodiment, described in connection with the accompanying figures.

DESCRIPTION OF EMBODIMENTS

Figure 1A:
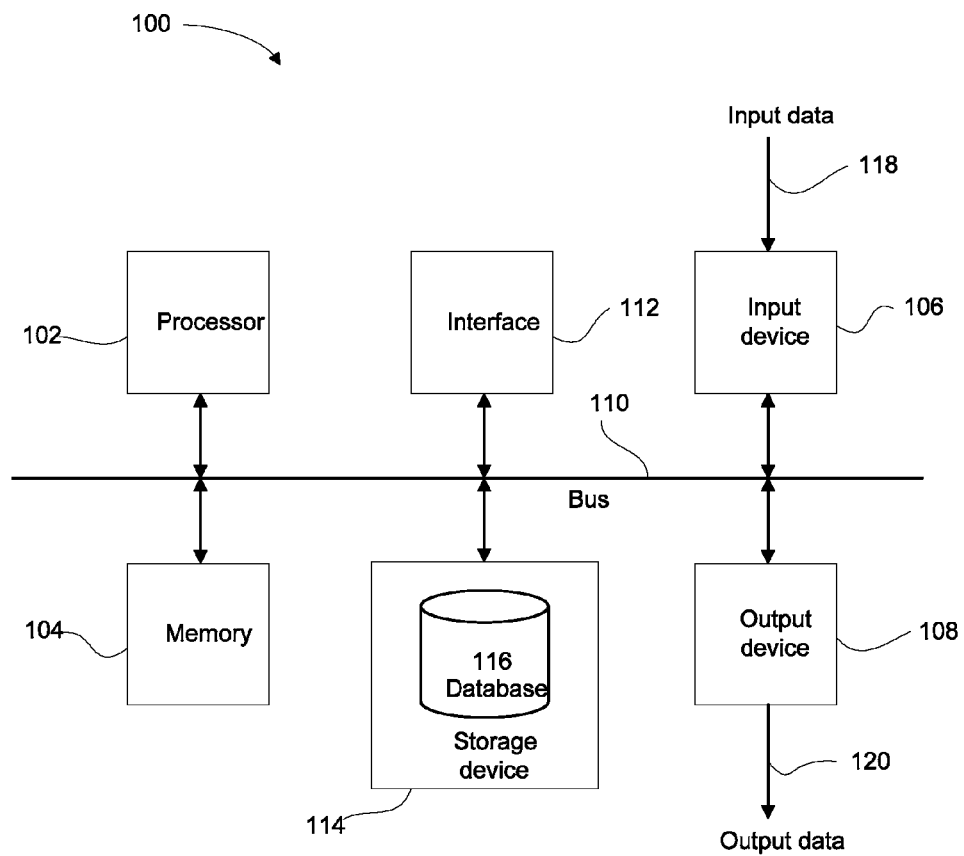
FIG. 1A illustrates a functional block diagram of an example processing system that can be utilised to embody or give effect to a particular embodiment.

The following modes, given by way of example only, are described in order to provide a more precise understanding of the subject matter of a preferred embodiment or embodiments. In the figures, incorporated to illustrate features of an example embodiment, like reference numerals are used to identify like parts throughout the figures.

A particular embodiment can be realised using a processing system, an example of which is shown in FIG. 1A. In particular, the processing system 100 generally includes at least one processor 102, or processing unit or plurality of processors, memory 104, at least one input device 106 and at least one output device 108, coupled together via a bus or group of buses 110. In certain embodiments, input device 106 and output device 108 could be the same device. An interface 112 also can be provided for coupling the processing system 100 to one or more peripheral devices, for example interface 112 could be a PCI card or PC card. At least one storage device 114 which houses at least one database 116 can also be provided. The memory 104 can be any form of memory device, for example, volatile or non-volatile memory, solid state storage devices, magnetic devices, etc. The processor 102 could include more than one distinct processing device, for example to handle different functions within the processing system 100.

Input device 106 receives input data 118 and can include, for example, a keyboard, a pointer device such as a pen-like device or a mouse, audio receiving device for voice controlled activation such as a microphone, data receiver or antenna such as a modem or wireless data adaptor, data acquisition card, etc. Input data 118 could come from different sources, for example keyboard instructions in conjunction with data received via a network. Output device 108 produces or generates output data 120 and can include, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 could be distinct and derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

In use, the processing system 100 is adapted to allow data or information to be stored in and/or retrieved from, via wired or wireless communication means, the at least one database 116 and/or the memory 104. The interface 112 may allow wired and/or wireless communication between the processing unit 102 and peripheral components that may serve a specialised purpose. The processor 102 receives instructions as input data 118 via input device 106 and can display processed results or other output to a user by utilising output device 108. More than one input device 106 and/or output device 108 can be provided. It should be appreciated that the processing system 100 may be any form of terminal, server, specialised hardware, or the like.

Figure 1B:
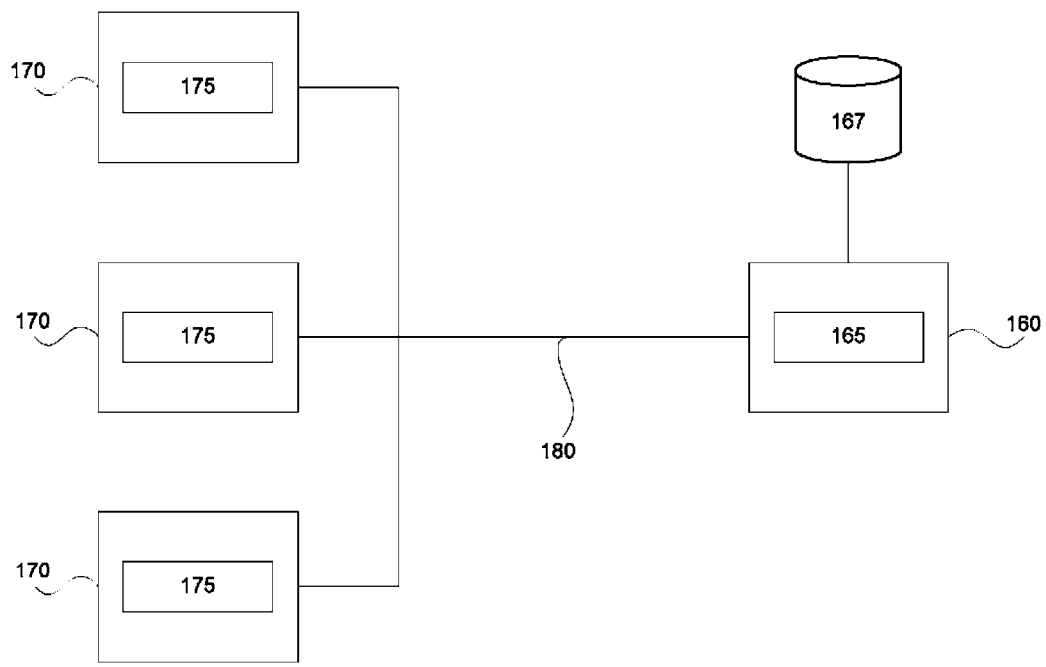
FIG. 1B illustrates a system a block diagram representing a system for determining a recommended alteration to a client processing system.

Referring to FIG. 1B there is shown a block diagram of a system for determining a recommended alteration to a client processing system.

In particular, the system 150 includes a server processing system 160 and a plurality of client processing systems 170 in data communication with the server processing system 160 via one or more communication networks 180, such as the Wide Area Network (WAN) like the Internet, and/or a LAN like an intranet.

Figure 2:
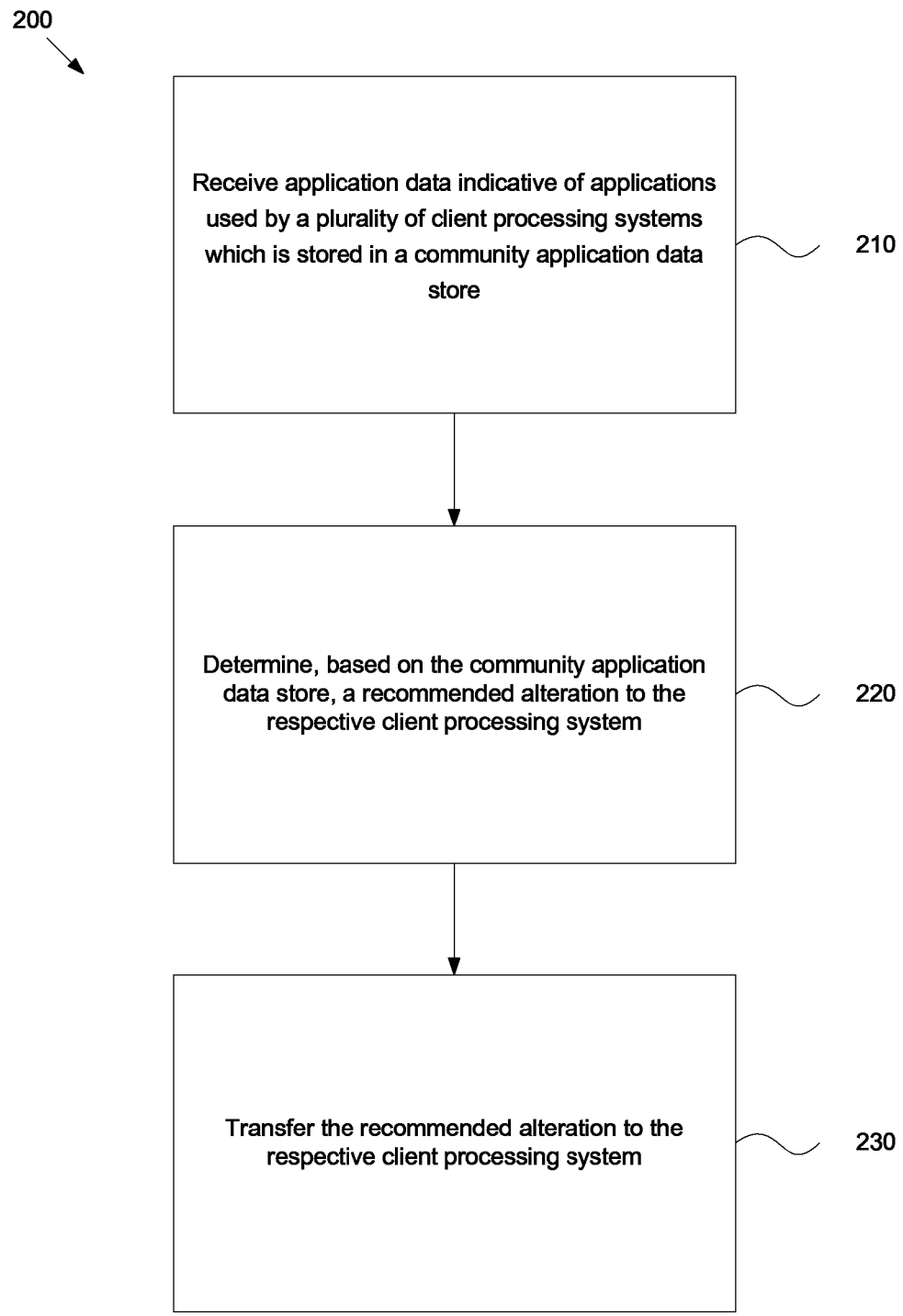
FIG. 2 illustrates a flowchart representing an example method of determining a recommended alteration to a client processing system.

Referring to FIG. 2 there is shown a flowchart representing an example method of determining a recommended alteration to a client processing system. The method of FIG. 2 will be described with reference to the system 150 of FIG. 1B.

In particular, at step 210, the method 200 includes the server processing system 160 receiving application data indicative of one or more applications used by each client processing system 170, wherein the application data is stored in a community application data store. At step 220, the method 200 includes the server processing system 160 determining, based on the community application data store, a recommended alteration for one of the client processing systems 170. At step 230, the method includes the server processing system 160 transferring the recommended alteration to the respective client processing system 170.

It will be appreciated that a processing system can be provided which is configured to perform method 200. In particular, the processing system includes the server processing system 160 and the community application data store 167, in communication with the server processing system 160, having stored therein application data indicative of one or more applications used by a plurality of client processing systems 170. In addition, the processing system includes a computer readable medium in communication with the server processing system 160. The computer readable medium, when used by the server processing system 160, causes the server processing system 160 to determine, based on the community application data store, a recommended alteration to one of the client processing systems 170, and transfer the recommended alteration to the respective client processing system 170.

Additionally, it will be appreciated that a non-transient computer readable medium can be provided which includes computer executable instructions which configure the server processing system 160 to perform as described above. The computer readable medium which configures the server processing system 160 is generally a server application 165 which analyses application data for a particular one of the client processing systems 170 against the community application data store for the plurality of processing system 170 to determine the recommended alteration to the respective client processing system 170.

A non-transient computer readable medium can additionally be provided which configures one of the client processing systems to obtain a recommended alteration from the server processing system. Generally, the computer readable medium may be downloaded from another processing system via the Internet and installed upon the respective client processing system. The computer readable medium includes executable instructions which configure the client processing system to: generate application data indicative of one or more applications used by the client processing system; transfer, to the server processing system, the application data to the server processing system for storage as part of the community application data store; and receive, from the server processing system, a recommended alteration to the client processing system based upon the community application data store.

Generally, the computer readable medium which configures the respective client processing system to operate in the manner described is a client application 175. The client application 175 collects and transfers the application data to the server processing system 160.

In some embodiments, the community application data store is a server data store 167 as shown in FIG. 1B which can be provided in the form of a database. The community application data store 167 stores therein the application data received from each client processing system. In one configuration, the application data includes an identity of respective client processing system, wherein each application data record is stored in the community application data store 167 according to each client processing system such that a centralized data store of all applications being used by the plurality of client processing systems can be used to determine a recommended alteration for a particular client processing system. In an additional or alternate configuration, the application data may be processed when stored in the community application data store such that data is stored on a per application basis. This will be discussed in further detail in later examples.

Figure 3:
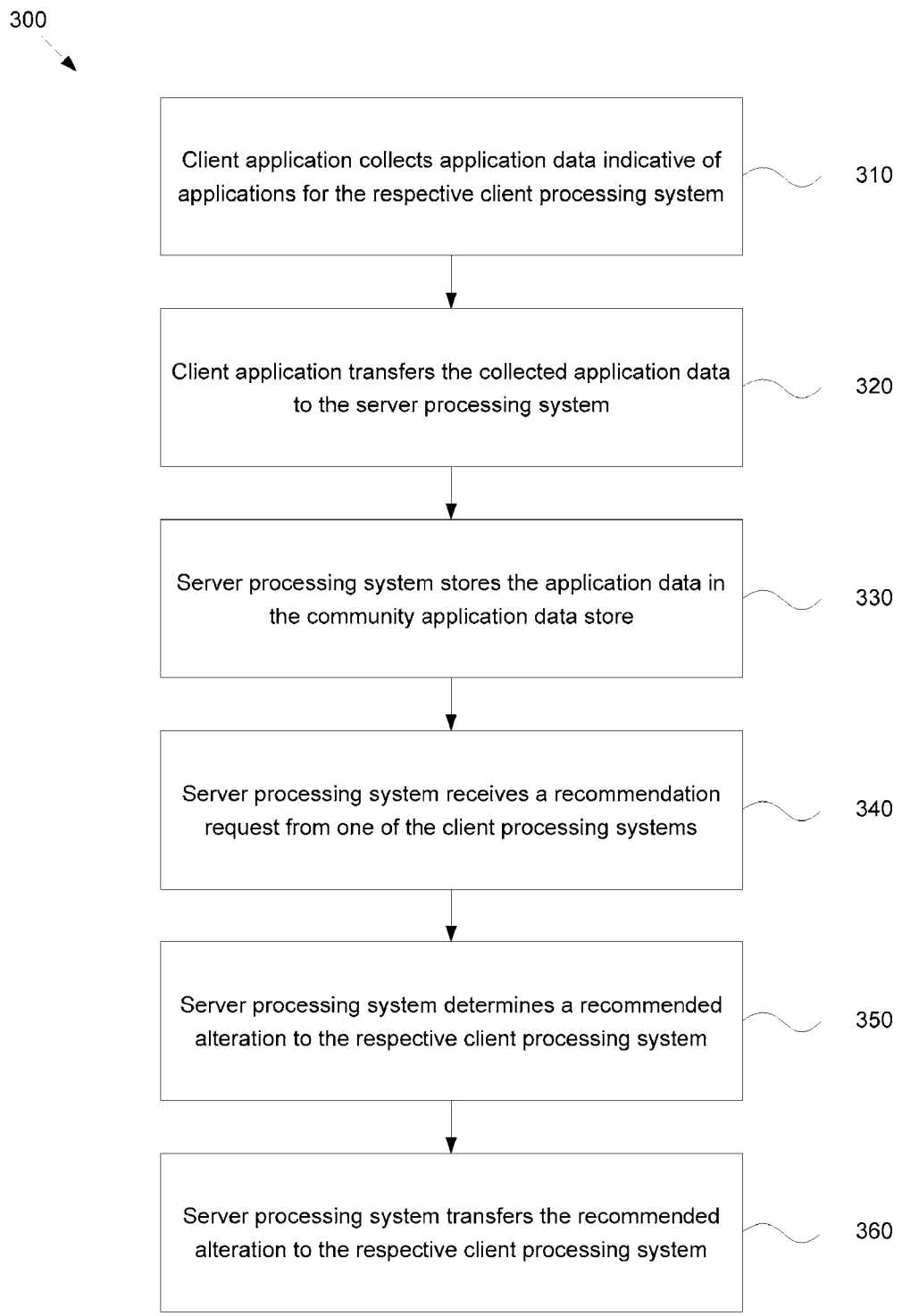
FIG. 3 illustrates another flowchart representing a more specific example of a method for determining a recommended alteration to a client processing system.

Referring to FIG. 3 there is shown another flowchart representing a more specific example of a method for determining a recommended alteration to a client processing system. The method of FIG. 3 will be described with reference to the system 150 of FIG. 1B.

Referring to FIG. 3, at step 310, the method 300 includes each client application 175 generating application data indicative of one or more applications used by each respective client processing system 170. Generally, the application data is indicative of one or more applications installed upon the respective client processing system 170.

The client application 175 can generate the application data upon selective operation by a user of the client processing system 170 via interaction with an interface of the client application 175 via an input device of the client processing system 170. Thus the user may launch the client application 175 on the client processing system 170 and execute a function to begin the generation of the application data for the respective client processing system 170. Alternatively, upon launching the client application 175, the client application automatically begins generating the application data for transfer accordingly.

Additionally or alternatively, the client application 175 may be configured to automatically perform the generation of the application data without user input at the client processing system 170. For example, the client processing system 170 may have a schedule of tasks to automatically perform upon a periodic basis, wherein a scheduled task of generating the application data is performed according to the schedule.

Additionally or alternatively, the client application 175 may be configured to generate the application data in response to a monitored event performed by the client processing system 170. For example, the client processing system 170 or the client application 175 may monitor for changes to configuration data, such as a change to a registry database for a Microsoft Windows operating system or alterations to a file structure of the client processing system 170. It will be appreciated that other portions of the hard drive may be monitored for other types of operating systems. The detection of the monitored event may result in the client application 170 automatically generating the application data. More specifically, the client processing system 170 may monitor for modifications to the configuration data indicative of a new application that has been installed on the client processing system 170. In an additional or alternate configuration, the client processing system 170 may monitor for one or more applications to crash. In specific examples, the client processing system may monitor a call to a function of the operating system which may be indicative of a monitored event, such as an application undergoing a crash, wherein the client processing system 170 is configured to intercept this call to the function, via a function hook, and begin generating the application data for the respective client processing system. Additionally or alternatively, the application data can be gathered in response to general services provided by the operating system of the client processing system.

In one option, the client application 175 can be configured to store a cached version of the application data. The client application 175 may use the cached version of the application data to generate the application data for transfer to the server processing system, wherein the application data for transfer is indicative of alterations (i.e. new applications being used or applications that have been removed) that have occurred to the client processing system 170 since the application data was last transferred to the server processing system 160. As will be appreciated, in the event that no alterations have occurred to the client processing system 170, no application data may be generated indicating that the community application data store is up to date for the respective client processing system.

The application data generated by the client application 175 is generally indicative of a unique application identifier identifying each application used by the client processing system. Furthermore, the application data is generally indicative of an identifier of the client processing system 170. In one configuration, a unique hardware identifier, such as the MAC address or a system serial number of the client processing system 170, may be used as a unique identifier of the client processing system 170. In another form, a unique identifier may be provided by the server processing system 160 which is stored by the client processing system 170 and used for identifying the client processing system 170. In a further example, a user of the client processing system 160 can register a unique identifier with the server processing system 160 which can be used by the client processing system 170 when generating the application data.

In one form, the application identifier may be a cryptographic hash value. The cryptographic hash value can be generated using contents of a binary associated with the respective application and optionally supporting resources thereof. The client application 175 can include a cryptographic hash function which identifies the binary and optionally supporting resources of a particular application used upon a client processing system 170 and then generates the cryptographic hash function. As will be appreciated, the application data can include the client processing system identifier and one or more cryptographic hash values indicative of a plurality of applications used upon the client processing system 170.

The application data generated by the client application 175 can, in addition to being indicative of the applications installed upon the respective client processing system 170, be further indicative of a number of other parameters of the one or more applications used by the client processing system 170.

In particular, the client application 175 may generate application data which is further indicative of one or more applications currently being used (i.e. applications that are open) upon the client processing system 170. In additional or alternative embodiments, the application data may be indicative of a temporal value indicative of the amount of time which each application has been used upon the client processing system. In an additional or alternate form, the application data may be indicative of a ranked frequency list of the applications, wherein the list ranks the applications according to the number of instances which an application has been launched or accessed. In another additional or alternate form, the application data can be indicative of a frequency of malfunctioning activity of each application. For example, the frequency of malfunctioning activity may be indicative of the frequency of crashes which an application has experienced upon the client processing system 170. In another additional or alternate form, the application data may be indicative of client processing system 170 resources used by each application, such as CPU usage, system memory usage, or undesirable behaviour, such as thrashing of the hard disk of the client processing system 170.

In order to record the parameters above, the client application 175 may be active in the background of the operating system of the client processing system 170, monitoring particular events performed by the one or more applications. In particular, hook functions may be utilised to monitor events for launching an application, switching focus for an application, closing an application, and a crash of an application. Upon detecting one of more of these events, the client application can record the detection of the event in a file indicative of the application data with a timestamp for each detected event. The detected events are recorded in a concatenated manner in the file. Thus, timeframes between opening and closing of a particular application can then be used to determine a period of time the application was used for example.

In one embodiment, the application data can also be generated on a per user basis. In particular, the client processing system 170 may be used by multiple users. In this regard, different applications may be accessible or used by different user's of the client processing system 170. In this embodiment, the application data can additionally be indicative of the user. In one embodiment, when the application data is to be generated, the user is prompted to input a user name. Alternatively, a system variable of the client processing system 170 may be identified by the client application 175 which is indicative of the user of the client processing system 170.

At step 320, the method includes each client application 175 transferring the collected application data to the server processing system 160.

As will be appreciated, the application data does not need to be transferred to the server processing system 160 simultaneously by all the client processing systems 170. The transfer of the application data can be performed over the communication network such as the Internet. The application data may also be indicative of a timestamp indicative of when the application data was generated by the respective client processing system. Alternatively, the server processing system 160 may associate the time which the application data is received at the server processing system 160 as the timestamp. This timestamp characteristic may assist in determining whether particular changes in the applications installed on a client processing system 170 may have resulted in malfunctions.

The client application 175 can include one or more transfer rules to determine if the application data needs to be transferred to the server processing system 160. In particular, in the event of a particular event is detected by the client application 175 which is performed by the client application 175, this detection may trigger the client processing system 170 to transfer the application data. In an additional or alternate example, the transfer of the application data may be a scheduled event (i.e. once every week) which is triggered according to a schedule. In an additional or alternate example, the server processing system 160 may transfer a request to the client application 175 of a client processing system 170 to transfer the application data.

At step 330, the method includes the server processing system 160 storing the application data in the community application data store 167. In particular, the community application data store 167 can include two sections, namely a client section and an application section. In the event that the community application data store 167 is a database, the client and application sections could each be considered database tables, although it is appreciated that various database structures could be used.

The client section includes application data for each client processing system 170. The server processing system 160 can record and update the newly received application data for a client processing system by identifying if a client record already exists in the data store for a specific client processing system 170, wherein the client processing system identifier can be used to perform the identification. Then the identified client record can be updated with the application data. In one form, the application data may be indicative of only changes to the respective client processing system 170 using a cache system stored at the client processing system 170, thus the alterations are only recorded or updated to the client section of the community application data store.

The application section includes application records indicative of application data for each application. For example, a particular application record may be indicative of Microsoft Word 2007. Various parameters recorded by the plurality of client processing systems are stored in the application record. The various parameters can be generated by the processor via the client section of the community application data store 167. Each application record may be uniquely identified via the application identifier, which as previously discussed may be a hash value of the binary associated with the application or similar.

Some of the application records may include metadata indicative of various data for an application, such as file size, product version, description, company, website, direct download URL, direct purchase URL, category (e.g. accounting, graphics, utilities, etc), statistics gathered from client applications of respective client processing systems 170 wherein the statistics may be indicative of user ratings, total number seen, crashes, usage frequency, and ease of use.

In the event that application data is collected upon a user basis (i.e. multiple users using the single client processing system), the client section may have multiple user records associated with a client record, wherein each user record is unique for a particular user. Alternatively, the community application data store may include a user section, wherein user records store application data for a user of a client processing system, wherein each user record is uniquely referenced via a user identity.

In the event that the application data is generated on a per user basis, the server processing system 160 may store in each user record a user profile. In particular, the server processing system 160 can be configured to determine, based on one or more user profile rules, at least portions of the user profile based on the application data collected for the specific user. In particular, data indicative of computer literacy, interests and/or hobbies, industry, age, and or income bracket may be determined by the server processing system 160 based upon the application data collected from the respective client processing system 170 of the user. For example, potentially if the application data for a specific user indicates that all applications are open source or low cost applications, then the server processing system 160 may be able to determine and store data a user profile indicative of a low income bracket due to no proprietary applications being installed upon the user' client processing system 170.

It will be appreciated that a plurality of user profile rules can be applied by the server processing system 160 to determine other user profile characteristics of the user. For example, the server processing system 160 may identify, in addition to the low income bracket, that a substantial proportion of the applications used on one of the client processing system 170 may relate to a particular profession, for example software development applications. Therefore, an additional user profile characteristic in relation to the profession of the user can be recorded in the user profile record.

In a further variation, the client processing system 170 may transfer, to the server processing system 160, a geographical indicator indicative of where the user is geographically located. This may be determined based on the IP address of the client processing system 170. The server processing system 160 may then determine, based on the geographical indicator, a demographic characteristic of the user. If the geographical indicator changes a number of times (i.e. equaling or exceeding a threshold) over a particular period, the server processing system 160 can determine, based on one of the user profile rules, that the user travels more than normal.

In another configuration, multiple user profile rules may be used in combination to determine a single user profile characteristic. For example, the location of the user as well as whether a substantial number open source applications are used by the user may be used in combination to determine that the income bracket user profile characteristic for the user.

In additional or alternate configurations, the user profile may be determined by the server processing system 160 based upon an amount of time the one or more applications have been used and/or a client processing system configuration.

In another configuration, a particular user profile characteristic may require a particular combination of user profile rules to be satisfied and/or unsatisfied in order to record a user profile characteristic in the data store 167.

For example, in the event that a user uses one or more open source applications but is identified, based on the IP address, as being located in Monaco, then the server processing system 160 is unable to determine, based on this combination of the satisfied user profile rules, the income bracket of the user (ie. open source software is generally associated with low income bracket, but the geographic area of Monaco is generally associated with high income bracket). However, if the server processing system 160 further identified that a significant proportion of the application related to accountancy applications, then it is likely that the combination of the geographical location and assumed profession of the user indicates that the user is in a high income bracket and that the one or more open source applications can be ignored as being indicative of the income bracket of the user.

The server processing system 160 can have stored in the data store the user profile rules and combinations thereof which lead to a conclusion as to whether the user possess one or more user profile characteristics.

Particular rules may be weighted according to their importance for particular user profile characteristics (i.e. software development applications may indicate a high level of computer literacy and thus may be heavily weighted for this user profile characteristic), wherein user profile weighting data can be stored in the data store and recalled by the server processing system 160 when profiling the user. The server processing system 160 may calculate a user profile characteristic score for each user profile characteristic based on whether particular user profile rules are satisfied or unsatisfied, wherein a user profile characteristic score can be compared against a user profile characteristic threshold to determine whether a user is to be classified as possessing a particular user profile characteristic or not.

The server processing system 160 may also store in the community application data store a client processing system configuration. The client processing system configuration is indicative of hardware and operating system specifications (i.e. CPU, RAM, Operating System, model if available) of the respective client processing system. In one variation, as there may be a large variety of client processing system configurations, the server processing system 160 may store in the community application data store is indicative of client processing system profile. In particular, the server processing system 160 may have stored in memory a predefined number of client processing system profiles, wherein the server processing system 160 selects, based on the client processing system configuration, one of the predefined client processing system profiles which is appropriate for the respective client processing system 170.

It will be appreciated that the techniques described above for profiling a user of a client processing system 170 can be alternatively performed by the client application 175 at each client processing system 170, wherein the determined profile can then be transferred to the server processing system 160 for storage in the data store 167.

At step 340, the method includes the server processing system 160 receiving a recommendation request from one of the client processing systems 170. The request may be an automated activity which is transferred from the client application 175 executed upon one of the client processing systems 170. For example, in one form, the recommendation request may be transferred on a scheduled basis to the server processing system 160. In another form, in the event that a monitored event is detected and intercepted by the client application 175, such as an application crashing, then the request may be transferred automatically by the client application 175 to the server processing system 160. The client application 175 may include one or more recommendation rules, wherein in the event that one or more are satisfied based on the client application data results in the recommendation request being transferred. For example, if a threshold number of crashes are indicated by the application data then this specific recommendation rule has been satisfied and the client processing system 170 automatically transfers a recommendation request to the server processing system 160 accordingly. Alternatively, the request may be a user initiated function which the user may select via a user interface of the client application 175.

It will be appreciated that step 340 is optional. In particular, the server processing system 160 may schedule a recommendation determination for a respective client processing system 170 rather than receiving a recommendation request from a respective client processing system 170. In particular, the server processing system 160 may include a plurality of recommendation rules which can be applied to the client application data to determine if a recommended alteration should be determined by the server processing system 160. For example, a particular recommendation rule may determine whether a particular application has crashed more than a threshold number of instances, wherein in the event that the rule is satisfied, the server processing system begins step 350.

At step 350, the method includes the server processing system 160 determining a recommended alteration to the installed applications for the respective requesting client processing system 170. A number of methods can be utilised by the server processing system 160 to determine the recommended alteration to the installed applications for the respective client processing system 170.

For example, in the instance that an unstable application crashes upon the client processing system 170, the client application 175 may automatically detect the crash event and transfer a request to the server processing system 160. The server processing system 160 may then identify, using the data stored in the server data store 167 another application which is provided for the same application category as the crashed application. The recommendation may be based upon popularity on the application being installed amongst the community of client processing systems 170 or users.

Additionally, the sever processing system 160 may, as discussed above, include an indication of the number of instances that a particular application has crashed, thus the server processing system 160 may use multiple variables such as popularity and stability to determine the recommendation for an alteration to the installed applications for the respective client processing system 170. The request received from the client application 175 may be indicative of an initiating event of the request which can be factored into the recommendation by the server processing system 160. For example, in the above example, the client application 175 may indicate that the request was initiated due to an instable application, thus the server processing system 160 may provide more weight toward the factor of stability rather than popularity when determining the recommendation.

The recommendation may also be determined based on the server processing system 160 identifying similar users to the requesting user, based on the user profile data, and comparing the application data from each user to identify the recommended alteration to the installed applications upon the client processing system 170.

In another example, a particular user may have been classified by the user profile data stored by the server processing system 160 as a novice photo enthusiast with a unsatisfactory computer specification (i.e. low CPU speed, low RAM) and the application data received is indicative of the user having installed an advanced photo editor. The application data may indicate that the advanced photo editor application has been launched only on a few occasions and has not been operated for considerable periods of time. Additionally, the application data may indicate that the user is switching focus between the advanced photo editor application and an Internet browser application indicating that the user may not be finding the specific application intuitive. The application data may also indicate that the user has no online photo sharing tools instances. In this instance, once the request is received, either automatically or via user interaction, the server processing system 160 can recommend an editor more appropriate for the user's profile data. This may be determined by searching the server data store 167 for other users and associated application data which share a threshold similarity in the interest of the requesting user and the level of computer literacy experience in order to determine the one or more applications which the user should consider installing on their client processing system 170. Additionally or alternatively, the client processing system 170 may recommend an online sharing tool.

In another example, the server processing system 160 may detect, based on the application data received from a particular client processing system 170, that an installed application on the respective client processing system 170 is outdated and that a newer version of the application is available. In this instance, the server processing system 160 may utilise the direct download URL stored in the server data store 167 to prompt the user for an update and then download, launch and potentially install the update in a silent mode for the client processing system 170.

In another example, the recommendation request may be indicative of a particular application which triggered the request. For example, in the event that Microsoft Word crashed which caused the recommendation request to be received by the server processing system 160, the recommendation request may be indicative of Microsoft Word. The server processing system 160 then determines, from the community application data store 167, the application category of the particular trigger application for the recommendation request. Then, the server processing system 160 determines, based on the community application data store 167, the recommended alteration indicative of one or more new applications which correspond to the application category for the particular application.

In another form, the server processing system 160 can determine a plurality of new applications. In particular, the server processing system 160 determines, from the community application data store, a plurality of new applications having a corresponding application category to the particular application. Then, the server processing system 160 determines, based on the community application data, recommendation scores for the plurality of new applications. Then, the server processing system 160 generates a ranked list of new applications, ordered according to the recommendation scores, for the recommended alteration. Potentially, if a large number of new application are identified, it may not be practical to present an ordered list including every new application. Therefore, the server processing system can alternatively determine, based on a selection criteria and the recommendation scores (such as the top 5 applications with the highest recommendation score), at least one of the new applications from the plurality of new applications for the recommended alteration. In another example, in the event that the recommended alteration is provided to one of the client processing systems based on a particular monitored event of an application used by a client processing system 170, such as a particular application crashing, the server processing system 160 can be configured to weight the recommendation scores based on a number of instances each new application has been reported as having crashed in the community application data store.

At step 360, the method includes presenting the recommended alteration to the installed applications for the respective client processing system 170. In one form, the recommendation may be presented via the client application 175. In another form, the recommendation may be presented via a web browser presented upon the client processing system 170. If a recommendation for an application is provided which is not currently installed on the client processing system 170, a hyperlink such as a URL may be provided to allow the user to quickly implement the recommendation accordingly.

In a further example, the server processing system 160 may be able to present data as a simple or rich web interface. In this instance, user may be interested in rankings and lists of applications which are generated based on the application data collected from a plurality of client processing systems. The user may be able to sort and request presentation of the information according to various search queries, for example, lists of applications may be presented based upon factors such as popularity, category, stability, price, time-line.

In another example, the request may be provided to the server processing system 160 via a web browser. In particular, the user may drag and drop an indication of an application, such as an icon or file associated with an application, into a particular web-page associated with the recommendation service provided by the server processing system 160, wherein the web-browser instructs the client application 175 to generate an identifier of the selected application and forward application data indicative of the identifier of the application to the server processing system 160. The server processing system 160 may provide statistics and other information such as recommendations in response to the request.

It will be appreciated that the alteration to one of the client processing systems can include installing one or more new applications on the client processing system 170. For example, if the client processing system 170 has Adobe Photoshop installed thereupon but is not suitable for one or more reasons (i.e. inexperience, low processing power, etc) determined by the server processing system 160, the server processing system 160 may recommend Paint.NET as an alternate application to be installed upon the client processing system 170.

Additionally or alternatively, the alteration to one of the client processing systems 170 may include modifying one or more properties or settings of the one or more applications currently installed upon the requesting client processing system 170. For example, if the server processing system 160 determines that the hard disk is thrashing when one or more applications are being executed upon the client processing system 170, the recommended alteration provided by the server processing system 160 may be to change a property or setting for one or more of the executed applications such that the RAM is utilised more effectively or to change one or more settings determined to be problematic when set in conjunction with another aspect of the system profile to resolve the conflict, thus reducing thrashing.

In a further example, the alteration to one of the client processing systems 170 may include a recommended hardware alteration to the client processing system 170. For example, if one of the applications being commonly used upon the client processing system 170 is Adobe Photoshop, the server processing system 160 may recommend that the RAM of the client processing system 170 be increased in the event that the application data is indicative of poor user experience with this application.

In a further example, the server processing system 160 may generate a recommended alteration configuration module which the client processing system 170 can download from the server processing system 160 to install one or more applications and also uninstall one or more applications of the respective client processing system 170. The recommended alteration may include a link to a URL which is indicative of a location which the recommended alteration configuration module can be downloaded and executed by the client processing system 170 in order to adopt the recommended alteration.

In an additional or alternate configuration, the server processing system 160 may build a plurality of user profiles based upon the community application data store. In particular, the server processing system 160 determines, based on at least one of the client processing system configuration of the plurality of client processing system 170 and the amount of time the one or more applications have been used, the user profiles. In this configuration, rather than the user profiles being static and defined by the administrator of the server processing system 160, the user profiles are dynamically generated, potentially in a periodic manner, such that the user profiles reflect the community of users.

The above embodiments may take the form of an entirely hardware embodiment, an entirely software embodiment, firmware, or an embodiment combining software and hardware aspects.

Many modifications will be apparent to those skilled in the art without departing from the scope of the present invention.

The invention claimed is:

1. A system to determine a recommended alteration to a client processing system, wherein the system comprises:
    a server processing system;
    a community application data store, in communication with the server processing system, having stored therein application data indicative of one or more applications installed upon and used by a plurality of client processing systems;
    a non-transitory computer readable medium in communication with the server processing system, wherein the computer readable medium, when used by the server processing system, causes the server processing system to:
        determine, based on the community application data store, a recommended alteration to a client processing system, the client processing system being one of the plurality of processing systems; and
        transfer the recommended alteration to the client processing system, wherein the recommended alteration is indicative of one or more new applications to be installed upon the client processing system.

2. The system according to claim 1, wherein the server processing system is configured to receive a recommendation request from the client processing system to determine the recommended alteration.

3. The system according to claim 1, wherein the application data is indicative of an amount of time a particular application of the one or more applications has been used by a user of the client processing system and an amount of instances the particular application has crashed upon the client processing system, wherein the server processing system is configured to:
    determine if a recommendation threshold has been satisfied based upon the amount of instances the particular application has previously crashed upon the client processing system; and
    in the event of a positive determination, determine an alternative application to be recommended as the one or more new applications for installation upon the client processing system, based on a user profile, an application category of the particular application, and the community application data store;
    wherein the user profile is based upon the amount of time the particular application has been used by the user and one or more application categories for the one or more applications installed upon the client processing system used by the user.

4. The system according to claim 1, wherein the server processing system is configured to:
    determine a user profile for a user operating the client processing system and a client processing system configuration indicative of the configuration of the client processing system; and
    determine, based on at least one of the user profile and the client processing system configuration, the recommended alteration.

5. The system according to claim 4, wherein the server processing system is configured to:
    determine one or more application categories for the one or more applications used by the client processing system; and
    determine, based on the one or more application categories, the user profile.

6. The system according to claim 4, wherein at least some of the application data associated with the client processing system is indicative of at least one of:
    an amount of time the one or more applications have been used by the user; and
    the client processing system configuration;
    wherein the server processing system is configured to determine, based on at least one of the amount of time the one or more applications have been used and the client processing system configuration, the user profile.

7. The system according to claim 1, wherein the server processing system is configured to:
    determine, based upon the application data of the client processing system, if one or more recommendation thresholds have been satisfied; and
    in response to at least one of the one or more of the recommendation thresholds being satisfied, determine the recommendation alteration to the respective client processing system.

8. The system according to claim 7, wherein at least some of the application data associated with the client processing system is indicative of an amount of time the one or more applications have been used, wherein the server processing system is configured to determine if at least one of the one or more recommendation thresholds have been satisfied based upon the amount of time the one or more applications have been used.

9. The system according to claim 7, wherein at least some of the application data associated with the client processing system is indicative of an amount of instances the one or more applications have crashed, wherein the server processing system is configured to determine if at least one of the one or more recommendation thresholds have been satisfied based upon the amount of instances the one or more applications have crashed.

10. The system according to claim 7, wherein at least some of the application data associated with the client processing system is indicative of at least one of a frequency and duration of use of at least some of the one or more applications, wherein the server processing system is configured to determine if at least one of the one or more recommendation thresholds have been satisfied based upon at least one of the frequency and duration of use.

11. The system according to claim 1, wherein the server processing system is configured to:
    categorize each application according to an application category in the community application data store;

determine the application category for a particular application of the client processing system; and determine, based on the community application data store, the recommended alteration indicative of the one or more new applications which correspond to the application category for the particular application.

12. The system according to claim 11, wherein the server processing system is configured to:

determine, from the community application data store, a plurality of new applications having a corresponding application category to the particular application;

determine, based on the community application data, recommendation scores for the plurality of new applications; and generate a ranked list of new applications, ordered according to the recommendation scores, for the recommended alteration.

13. The system according to claim 12, wherein the server processing system is configured to:

determine, from the community application data store, a plurality of new applications having a corresponding application category to the particular application;

determine, based on the community application data, recommendation scores for the plurality of new applications; and determine, based on a selection criteria and the recommendation scores, at least one of the new applications from the plurality of new applications for the recommended alteration.

14. The system according to claim 12, wherein in the event that the recommended alteration is provided to one of the client processing systems based on the particular application crashing, the server processing system is configured to weight the recommendation scores based on a number of instances each new application has been reported as having crashed in the community application data store.

15. The system according to claim 1, wherein the one or more new applications of the recommended alteration is provided as an alternative for at least one of the one or more applications used by the client processing system.

16. A non-transitory computer readable medium for configuring a client processing system to obtain a recommended alteration from a server processing system, the non-transitory computer readable medium including executable instructions which, when executed, configure the client processing system to:

generate application data indicative of one or more applications installed upon and used by a user of the client processing system;

transfer, to the server processing system, the application data to the server processing system for storage as part of a community application data store; and receive, from the server processing system, a recommended alteration to the client processing system based upon the community application data store, wherein the recommended alteration is indicative of one or more new applications to be installed upon the client processing system.

17. The non-transitory computer readable medium according to claim 16, wherein the recommended alteration is indicative of one or more new applications for installation as an alternative for at least one of the one or more applications currently installed upon and used by the user of the client processing system.

18. The non-transitory computer readable medium according to claim 16, wherein the executable instructions configure the client processing system to transfer a recommendation request to the server processing system in order to receive the recommended alteration to the client processing system.

19. The non-transitory computer readable medium according to claim 18, wherein the recommendation request is transferred to the server processing system in response at least one of:

the client processing system detecting a monitored event performed by the client processing system;

a schedule; and user operation of an input device of the client processing system.

20. The non-transitory computer readable medium according to claim 16, wherein the application data generated by the client processing system is indicative of at least one of:

an amount of time the one or more applications have been used;

an amount of instances the one or more applications have crashed; and an amount of instances a user switches focus between at least some of the one or more applications.

* * * * *